(12) United States Patent
Kuo

(10) Patent No.: US 10,448,129 B2
(45) Date of Patent: Oct. 15, 2019

(54) OPTICALLY-SWITCHED DATA NETWORK

(71) Applicant: Roshmere, Inc., San Diego, CA (US)

(72) Inventor: Ping-Piu Kuo, San Diego, CA (US)

(73) Assignee: Roshmere, Inc., San Diego, CA (US)

( * ) Notice: Subject to any disclaimer, the term of this patent is extended or adjusted under 35 U.S.C. 154(b) by 45 days.

(21) Appl. No.: 15/900,483

(22) Filed: Feb. 20, 2018

(65) Prior Publication Data

US 2018/0176667 A1 Jun. 21, 2018

Related U.S. Application Data

(63) Continuation of application No. 15/610,275, filed on May 31, 2017, now Pat. No. 9,918,149.

(Continued)

(51) Int. Cl.

| H04J 14/00 | (2006.01) |
|---|---|
| H04B 10/08 | (2006.01) |
| H04B 17/00 | (2015.01) |
| H04Q 11/00 | (2006.01) |
| H04B 10/278 | (2013.01) |
| H04J 14/02 | (2006.01) |
| H04J 14/08 | (2006.01) |

(52) U.S. Cl.
CPC ....... H04Q 11/0062 (2013.01); H04B 10/278 (2013.01); H04J 14/0267 (2013.01); H04Q 11/00 (2013.01); H04Q 11/0005 (2013.01); H04J 14/00 (2013.01); H04J 14/08 (2013.01); H04Q 2011/009 (2013.01); H04Q 2011/0018 (2013.01)

(58) Field of Classification Search
CPC .......... H04Q 11/0062; H04Q 11/0005; H04Q 2011/0018; H04Q 2011/009; H04B 10/278

USPC .............................. 398/48, 36, 45
See application file for complete search history.

(56) References Cited

U.S. PATENT DOCUMENTS

| 5,319,485 A | 6/1994 | Yasui et al. |
| 6,026,204 A * | 2/2000 | Chbat .............. H04B 10/25253 385/24 |

(Continued)

OTHER PUBLICATIONS

International Search Report and Written Opinion dated Sep. 7, 2017 for PCT Patent Application No. PCT/US2017/035296.

(Continued)

*Primary Examiner* — Abbas H Alagheband
(74) *Attorney, Agent, or Firm* — MLO, a professional corp.

(57) ABSTRACT

An optically-switch data network includes an optical data bus, an optical wavelength bus, and multiple nodes connected by the optical data bus and the optical wavelength bus. A first node determines that it has communication information to transmit to a second node, and determines if a first subscription signal is present on the optical wavelength bus. The first subscription signal includes a target frequency. If the first subscription signal is not present on the optical wavelength bus, the first node injects an optical communication signal onto the optical data bus. The optical communication signal includes the communication information and a carrier wave. The carrier wave includes the target frequency. The second node receives the optical communication signal using the optical data bus. If the first subscription signal is present on the optical wavelength bus, injection of the optical communication signal onto the optical data bus is postponed.

20 Claims, 15 Drawing Sheets

Related U.S. Application Data

(60) Provisional application No. 62/344,107, filed on Jun. 1, 2016.

(56) References Cited

U.S. PATENT DOCUMENTS

| | | | | |
|---|---|---|---|---|
| 6,594,045 | B2* | 7/2003 | Liu | H04B 10/27 398/43 |
| 6,687,463 | B1* | 2/2004 | Hutchison | H04J 14/0206 385/16 |
| 6,782,204 | B1 | 8/2004 | Thomas et al. | |
| 6,990,294 | B2* | 1/2006 | Ikoma | H04B 10/00 396/26 |
| 7,164,861 | B2 | 1/2007 | Takachio et al. | |
| 7,433,594 | B2* | 10/2008 | Takachio | H04B 10/271 398/4 |
| 7,809,265 | B2* | 10/2010 | Nuzman | H04Q 11/0062 398/47 |
| 9,031,406 | B2* | 5/2015 | Hui | H04J 14/022 398/50 |
| 9,130,691 | B2* | 9/2015 | Xia | H04J 14/02 |
| 9,590,736 | B2* | 3/2017 | Wellbrock | H04L 41/0816 |
| 9,699,530 | B2* | 7/2017 | Morgan | H04J 14/00 |
| 2002/0154357 | A1* | 10/2002 | Ozveren | H04J 14/0201 398/85 |
| 2003/0007209 | A1 | 1/2003 | Liu et al. | |
| 2003/0185229 | A1* | 10/2003 | Shachar | H04L 12/43 370/460 |
| 2004/0240881 | A1* | 12/2004 | Dotaro | H04J 14/0227 398/19 |
| 2006/0257146 | A1 | 11/2006 | Nuzman | |
| 2007/0242625 | A1* | 10/2007 | Dunne | H04J 14/0204 370/258 |
| 2008/0131128 | A1* | 6/2008 | Ota | H04J 14/0201 398/79 |
| 2008/0193133 | A1 | 8/2008 | Krug et al. | |
| 2008/0232803 | A1* | 9/2008 | Maier | H04Q 11/0062 398/59 |
| 2009/0304387 | A1 | 12/2009 | Farries et al. | |
| 2010/0054658 | A1 | 3/2010 | Carothers | |
| 2010/0129078 | A1* | 5/2010 | Weston-Dawkes | H04J 14/0212 398/79 |
| 2010/0272439 | A1* | 10/2010 | Katayama | H04Q 11/0062 398/59 |
| 2011/0097086 | A1 | 4/2011 | Binkert et al. | |
| 2012/0155871 | A1* | 6/2012 | Fukashiro | H04J 14/02 398/50 |
| 2013/0315580 | A1* | 11/2013 | Boertjes | H04J 14/0204 398/5 |
| 2014/0241721 | A1 | 8/2014 | Xia et al. | |
| 2014/0355976 | A1* | 12/2014 | Matsunaga | H04J 14/0221 398/7 |
| 2015/0063807 | A1* | 3/2015 | Simonneau | H04B 10/25 398/59 |
| 2015/0131991 | A1* | 5/2015 | Hattori | H04J 14/0212 398/47 |
| 2015/0237421 | A1 | 8/2015 | Morgan et al. | |
| 2016/0094308 | A1* | 3/2016 | Liboiron-Ladouceur | H04J 14/04 398/44 |
| 2016/0182146 | A1* | 6/2016 | Schmidtke | H04B 10/038 398/2 |

OTHER PUBLICATIONS

Notice of Allowance dated Oct. 26, 2017 for U.S. Appl. No. 15/610,275.

* cited by examiner

OPTICALLY-SWITCHED DATA NETWORK

RELATED APPLICATIONS

This application is a continuation of U.S. application Ser. No. 15/610,275 filed on May 31, 2017, and entitled "Optically-Switched Data Network," which claims the benefit of U.S. Provisional Patent Application No. 62/344,107 filed on Jun. 1, 2016, and entitled "Optically-Switched Data Network," both of which are hereby incorporated by reference herein in their entirety for all purposes.

BACKGROUND

Data communications between computing devices is established using a data network. A data network includes network interfaces installed at/in each of the computing devices ("nodes") and electrical or optical physical media connecting those network interfaces to each other. Communication information is transformed into electrical or optical signals and then transported between the nodes using the physical media. In order to realize a communication network consisting of multiple nodes (sometimes referred to as a multi-node-network), network aggregation devices (NADs) in the form of hubs, switches or routers are often used to route the flow of data from the data's originating node to the data's destination node.

In some configurations, a NAD is connected to all nodes of the network, or a subset of the nodes of the network, either through a direct physical connection (or a link), or an indirect physical connection through other NADs. A full connection between the nodes (e.g., an all-to-all connection) may be prohibitively complex for practical purposes.

In some configurations, a network having many nodes is realized by defining hierarchical layers of NADs, whereby nodes on the same level are connected and communicate with the help of routing nodes/NADs of the higher hierarchical level. In an optical communication network, the data communication between the NADs (e.g., using the physical medium) is often conveyed by optical waves, whereas the NADs manipulate the electrical embodiment of signals/data. Thus, the NADs often include electrical-to-optical, optical-to-electrical, and optical-to-electrical-to-optical signal conversion modules. These modules can negatively impact energy efficiency, and complexity, of the NAD. Further, NADs include a finite number of ports to which physical connections to nodes and other NADs are made. Thus, NAD data traffic handling capacity is often bounded by the internal processing and the network interface throughput limit of each NAD. As such, conventional data network architectures are challenged by fundamental limitations in energy efficiency as well as scalability.

SUMMARY

In some embodiments, an optically-switched data network generally includes an optical data bus, an optical wavelength bus, and multiple nodes. Each node is connected to other nodes of the multiple nodes by the optical data bus and the optical wavelength bus. A first node of the multiple nodes is configured to determine that the first node has communication information to transmit to a second node of the plurality of nodes, and determine if a first subscription signal that includes a target frequency is present on the optical wavelength bus. If it is determined that the first subscription signal is not present on the optical wavelength bus, an optical communication signal is injected onto the optical data bus. The optical communication signal includes the communication information and a carrier wave. The carrier wave includes the target frequency. If it is determined that the first subscription signal is present on the optical wavelength bus, postpone injecting the optical communication signal onto the optical data bus. The second node is configured to receive the optical communication signal using the optical data bus.

In some embodiments, a method for exchanging data using an optically-switched data network having multiple nodes generally involves determining that a first node has communication information to transmit to a second node. The first node and the second node are of the multiple nodes. Each node of the multiple nodes is connected to the other nodes by an optical data bus and by an optical wavelength bus. It is determined if a first subscription signal is present on the optical wavelength bus. The first subscription signal includes a target frequency. If it is determined that the first subscription signal is not present on the optical wavelength bus, an optical communication signal is injected onto the optical data bus. The optical communication signal is received at the second node using the optical data bus. The optical communication signal includes the communication information and a carrier wave. The carrier wave includes the target frequency. If it is determined that the first subscription signal is present on the optical wavelength bus, injection of the optical communication signal onto the optical data bus is postponed.

DETAILED DESCRIPTION

Figure 1:
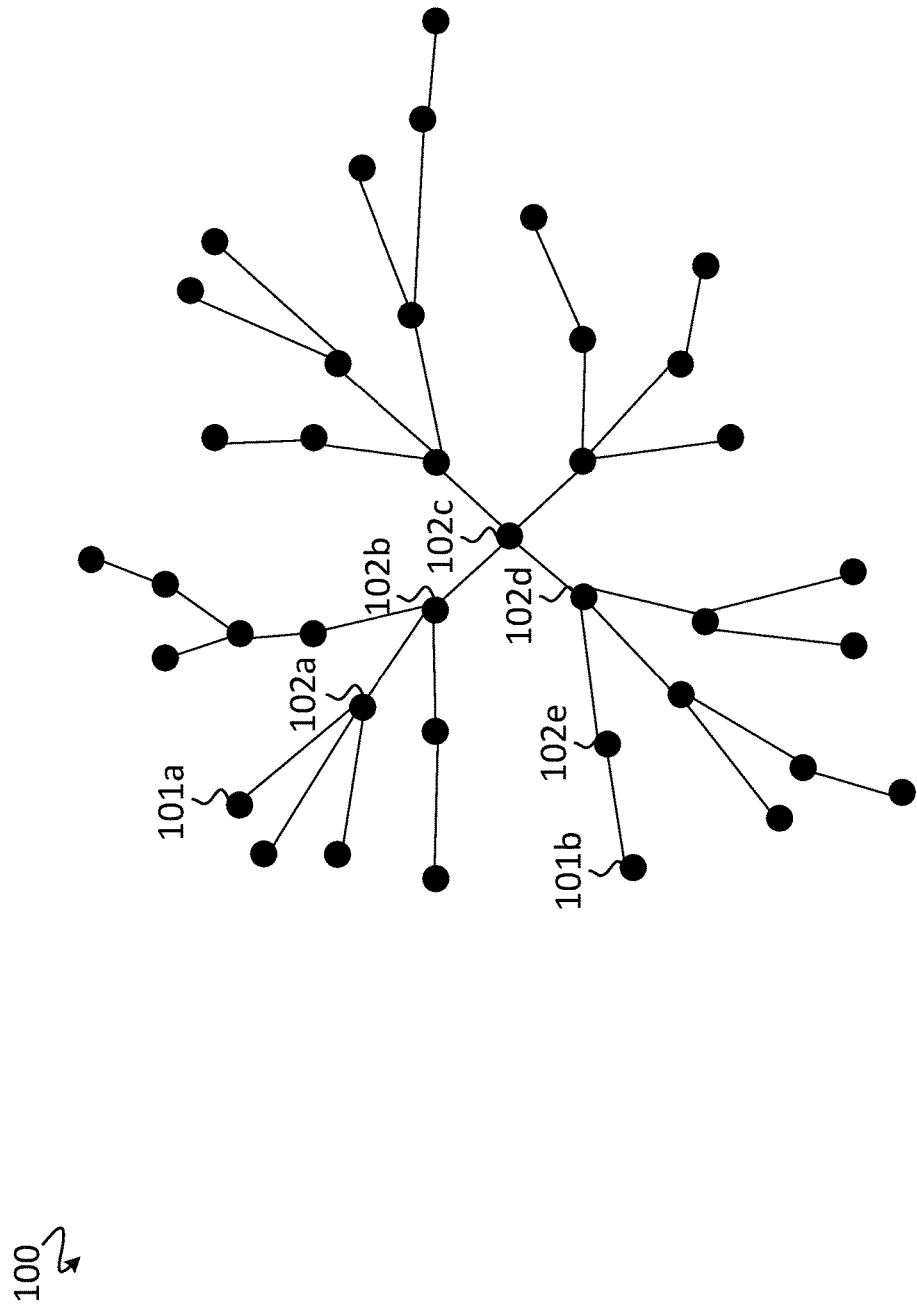
FIG. 1 is a simplified schematic representation of a prior art optical data network organized using a tree hierarchy.

Improved methods and systems are disclosed for routing data and performing data collision avoidance using a network system, such as an optically-switched (or wavelength-switched) data network system. The optically-switched data network system disclosed efficiently routes data between nodes and NADs of the optically-switched data network. In some embodiments, the optically-switched data network system is implemented by: (1) organizing nodes/NADs in a ring topology; (2) attributing an optical wavelength (a target frequency) to a particular transmission which will be transmitted from an originating node to a destination node; (3) modulating a carrier waveform having the target frequency; (4) setting a wavelength selective device (e.g. an optical tuning module) at the destination node to the target frequency; (5) transmitting the modulated carrier waveform from the originating node; and (6) receiving the modulated carrier waveform at the destination node. Parallelism is thus advantageously realized between the nodes and NADs of the optically-switched data network system.

In some embodiments, the nodes/NADs of the optically-switched data network system implement a decentralized collision avoidance system. Collision avoidance is implemented to preclude multiple nodes/NADs of the same physical bus (e.g., an optical data bus) from transmitting communication signals of the same target frequency (e.g., using the same waveform or same target wavelength) at the same time. Decentralized (node level) collision avoidance and wavelength routing advantageously reduces network complexity, because centralized network scheduling components can be simplified or eliminated. Additionally, because nodes described herein are capable of rapid tuning, sub-microsecond reconfigurable network switching is achieved.

In some embodiments, nodes/NADs of the optically-switched data network are connected by an optical data bus for exchanging optical communication signals. The nodes/NADs are also connected by an optical wavelength bus. The optical wavelength bus can advantageously be used as part of a network collision avoidance system using modulated carrier waves, as well as to provide unmodulated carrier waves to nodes. Additionally, the unmodulated carrier waves can be used to tune optical emitters (e.g., lasers) of respective nodes or be used directly by the node as carrier waves or as optical local oscillator waveforms.

Before a node can transmit data to another node, the transmitting node must indicate to all other nodes that the wavelength or frequency needed for the transmission is currently in use. In some embodiments, therefore, collision avoidance includes injecting, by the transmitting node, a subscription signal onto the optical wavelength bus. The subscription signal is a modulated carrier wave or waveform that includes a target frequency which is the same as the carrier wave used by the transmitting node for transmitting an optical communication signal on the optical data bus. The presence of the subscription signal on the carrier wave is thus an indication that the carrier wave is currently in use by one of the nodes, so the other nodes will avoid any attempt to use the same carrier wave at the same time. The subscription signal is formed, in some embodiments, by modulating a carrier wave of the target frequency with subscription information. In some embodiments, the subscription information is a known identification sequence. In some embodiments, the subscription information may include information associated with the transmitting node and/or attributes of the optical communication signal (e.g., signal length/duration/priority). In some embodiments, the subscription information can advantageously include network scheduling information.

Another node of the optically-switched data network detects the presence of the subscription signal on the optical wavelength bus and will postpone, pause, abstain from, cancel or halt transmission at the frequency of the subscription signal. In some embodiments, if the other node is able to tune to another frequency to communicate with another destination node, or the same destination node at a different frequency, the other node may select another target frequency.

FIG. 1 is a simplified schematic representation of a prior art optical data network 100 organized using a tree hierarchy. The optical data network shown includes nodes 101a-b and NADs 102a-e, among other nodes and NADs not labeled. In order for the node 101a to exchange data with the node 101b, the data must pass through each of the NADs 102a-e in this example.

Figure 2:
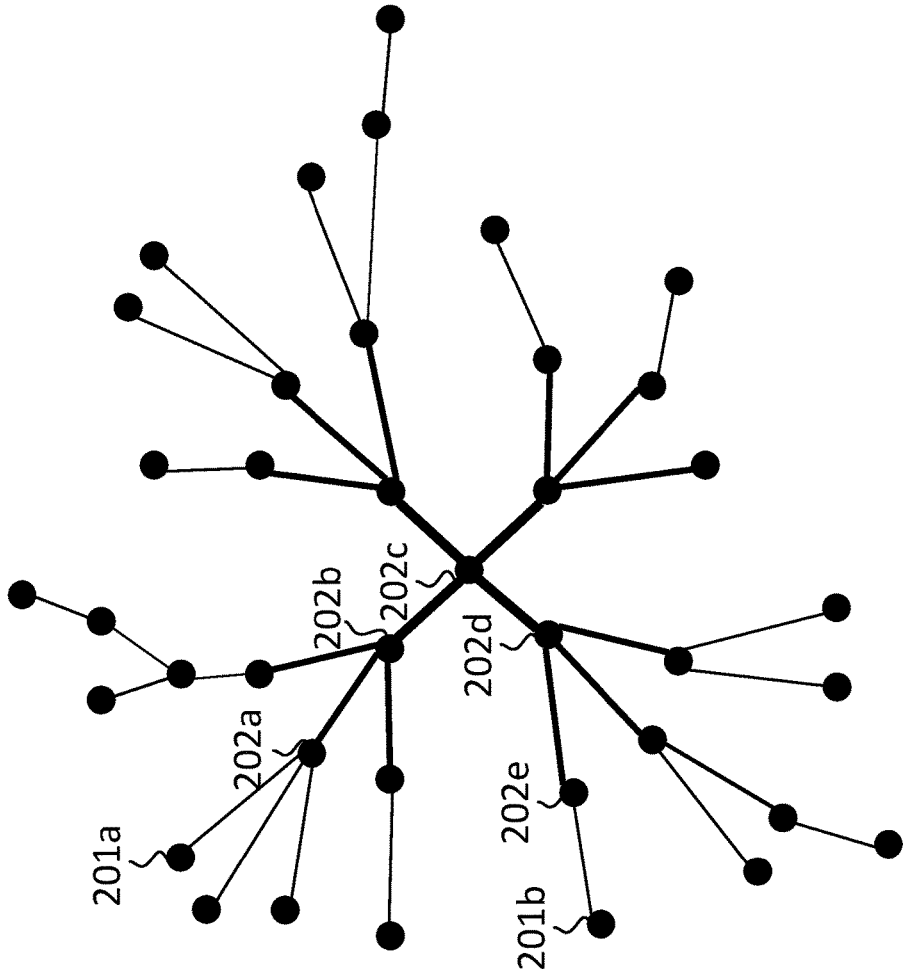
FIG. 2 is a simplified schematic representation of a prior art optical data network organized using a fat-tree hierarchy.

Conventional optical data networks like the network 100 are often optimized to provide higher data bandwidth between NADs which are higher in the tree hierarchy. This is illustrated in FIG. 2, which is a simplified schematic representation of a prior art optical data network 200 organized using a fat-tree hierarchy. The optical data network includes nodes 201a-b and NADs 202a-e, among other nodes and NADs not labeled. Bandwidth between network connections varies, as indicated by interconnecting lines of varying thickness, where a thicker line indicates a higher bandwidth communication path as compared to a thinner line, which indicates a lower bandwidth communication path. However, both of the above-mentioned conventional network architectures 100 and 200 still demand a massive number of high throughput NADs which are cost and power-consumption intensive.

Figure 3A:
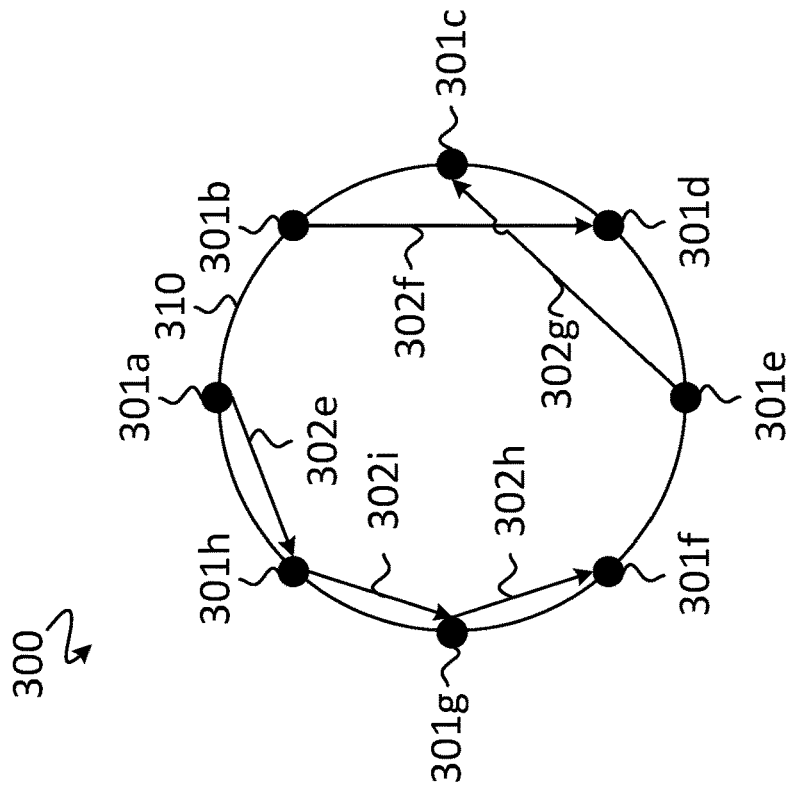
FIGS. 3A-C are simplified schematic representations of an optically-switched data network, in accordance with some embodiments.
Figure 3B:
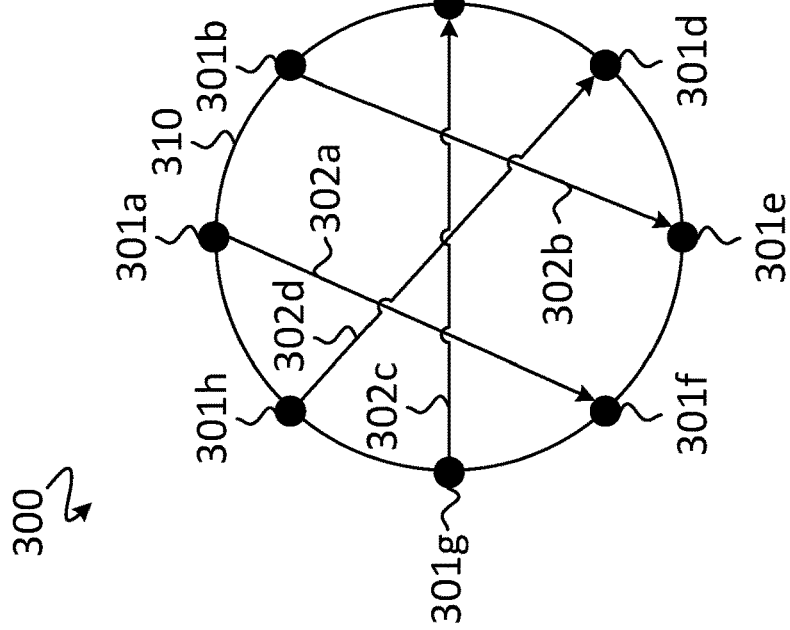
Figure 3C:
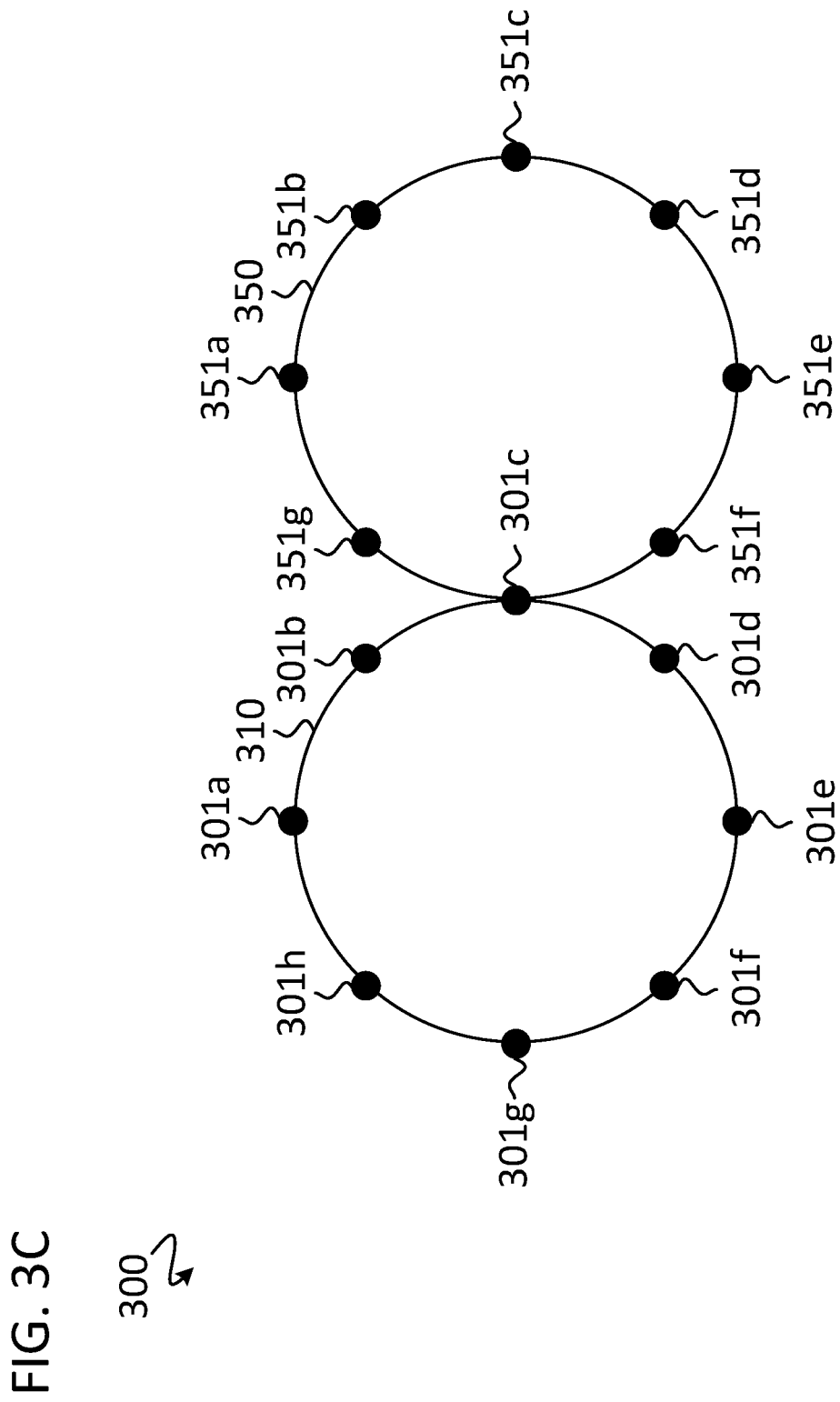

FIGS. 3A-C are simplified schematic representations of an optically-switched data network system 300, in accordance with some embodiments. The optically-switched data network system 300 generally includes nodes 301a-h connected by a physical bus 310 in a ring topology. FIG. 3C additionally illustrates an embodiment in which nodes 301a-h and 351a-g are connected in multiple rings that are concatenated together. In the illustrated example, the first physical bus 310 (with nodes 301a-h in a ring topology) and a second physical bus 350 (with nodes 351a-g and 301c in a ring topology) both include the node 301c, such that both rings are connected or concatenated together by the node 301c. Additional embodiments can potentially concatenate together any appropriate number of rings of nodes. The physical bus 310/350 may include signal buffers, signal amplifiers, filters, or other intervening modules in the path of the physical bus. Signal routing designators 302a-d are shown in FIG. 3A, and signal routing designators 302e-i are shown in FIG. 3B. For simplicity, only eight nodes (301a-h) are shown. However, the optically-switched data network system 300 could include any appropriate number of nodes. In some embodiments, one or more of the nodes 301a-h is a NAD which could connect to another similar network, or connect to a conventional network such as the network 100 or the network 200.

FIG. 3A shows data being routed between the subset of the nodes 301a-h, as represented by the signal routing designators 302a-d. For ease of explanation the signal routing designators 302a-d are illustrated as intersecting the physical bus 310 (e.g., traveling directly between the nodes 301a-h), thereby indicating which nodes are communicating with, or transmitting data to, which other nodes. However, data signals exchanged between the nodes 301a-h are transported using the physical bus 310. As shown by the signal routing designator 302a, the node 301a transmits data to the node 301f (via the physical bus 310); as shown by the signal routing designator 302b, the node 301b transmits data to the node 301e; as shown by the signal routing designator 302c, the node 301g transmits data to the node 301c; and as shown by the signal routing designator 302d, the node 301h transmits data to the node 301d.

FIG. 3B provides another example of data being routed within the optically-switched data network system 300 between the subset of the nodes 301a-h. As shown by the signal routing designator 302e, the node 301a transmits data to the node 301h (via the physical bus 310); as shown by the signal routing designator 302f, the node 301b transmits data to the node 301d; as shown by the signal routing designator 302g, the node 301e transmits data to the node 301c; as shown by the signal routing designator 302h, the node 301g transmits data to the node 301f; and as shown by the signal routing designator 302i, the node 301h transmits data to the node 301g.

As illustrated in FIG. 3C, in some embodiments, multiple "rings" are connected, each ring having in common one or more NADs. In the example shown, the node 301c is a NAD that is common to the physical bus 310 and to the physical bus 350. Thus, optical communication signals can be exchanged between any of the nodes 301a-h with any of the nodes 351a-g. The optically-switched data network system 300 may include other elements which have been omitted for simplicity.

Multiple wavelengths of light are used within (e.g., transported upon) the physical bus 310/350 to realize parallelism between the nodes/NADs (301a-h and 351a-g), as well as to implement information routing and delivery from an initiating to a destination computing device. In some embodiments, one or more optical sources capable of varying or adjusting its emitting wavelength, or emitting multiple wavelengths, are utilized to implement data routing between the nodes/NADs (301a-h and 351a-g) connected by the physical bus 310/350. In some embodiments, network interfaces of the nodes 301a-g/351a-g are equipped with optical sources capable of emitting and/or varying their wavelength among multiple wavelengths.

As shown, the nodes (301a-g, 351a-g) are connected to a common optical path (310/350) having a ring topology. Physically, the ring is constructed of cascaded segments of optical waveguides such as optical fiber. As a part of signal routing, at a given time, each node (301a-g, 351a-g) is assigned to receive optical signals of a particular wavelength (e.g., a target frequency). The desired (e.g., targeted, or addressed) node, upon reception of an optical communication signal, removes (e.g., extinguishes) the received optical communication signal from the physical bus (310/350) by utilization of a wavelength selective device. In order to transmit data to the desired node, the originating (or transmitting) node changes the wavelength of its internal optical source such that the emission wavelength matches the selected or assigned wavelength of the destination node. Data is then loaded onto the wavelength-matched optical wave by modulating the optical wave of the wavelength assigned by a (network) control device (not shown in FIGS. 3A-C). The modulated optical wave subsequently propagates along the data bus until reaching the destination node, in which its receiving wavelength selective device extracts the optical wave from the data bus, and recovers the conveyed communication information by detecting the modulation carried by the optical wave using a compatible optical detector. In the described manner, the set of nodes can achieve non-blocking communication with each other, altogether obviating the involvement of a network switch or router, as is common (or present) in the conventional network architecture.

Figure 4:
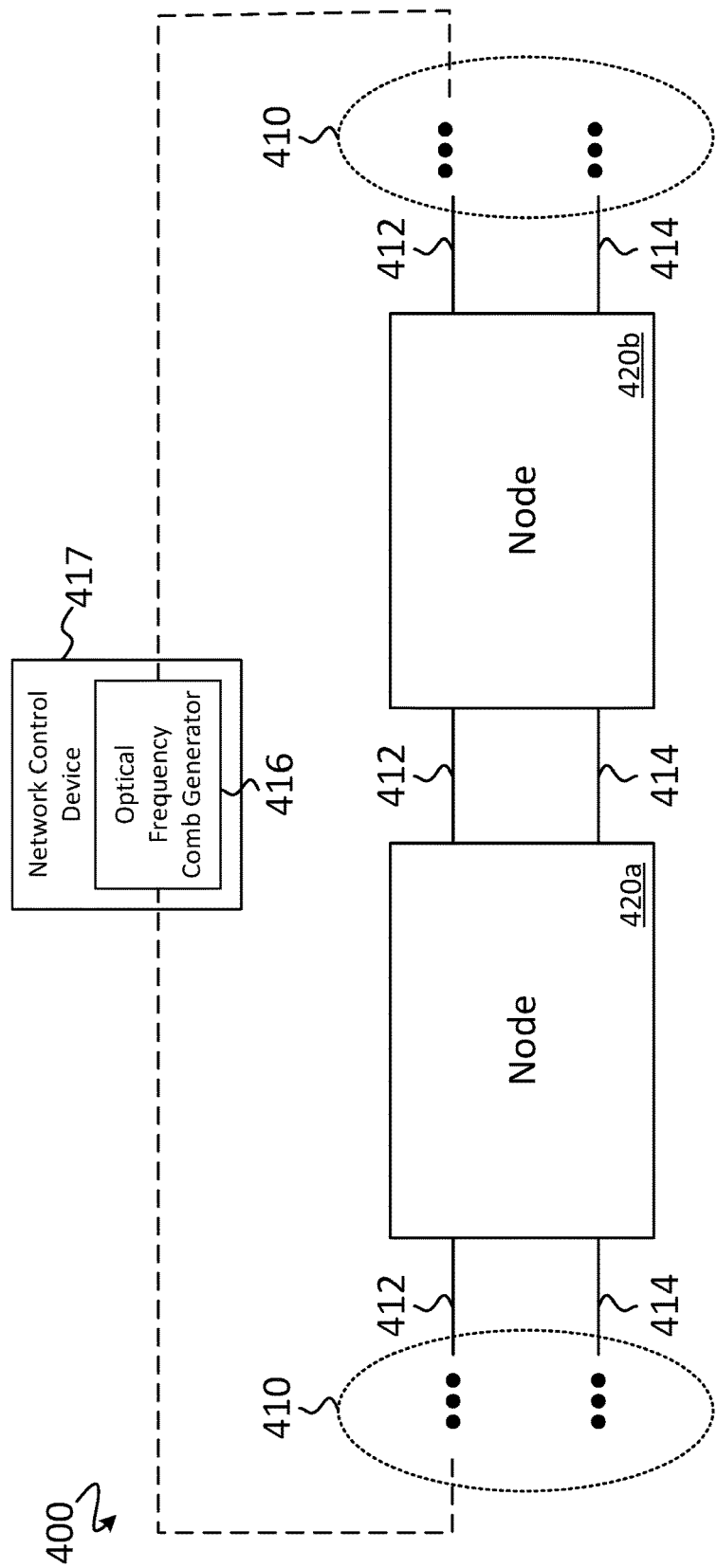
FIG. 4 is a simplified schematic representation of a segment of an optically-switched data network that is similar to the network shown in FIGS. 3A-C, in accordance with some embodiments.

FIG. 4 is a simplified schematic representation of a segment of an optically-switched data network system 400 (similar to the optically-switched data network system 300), in accordance with some embodiments. The segment generally includes a first node 420a, a second node 420b, and a physical bus 410. The nodes 420a-b are similar to the nodes 301a-h, 351a-g. The physical bus 410 includes an optical wavelength bus 412 and an optical data bus 414. In some embodiments, the optically-switched data network system 400 includes other modules or elements, including one or more additional nodes, which have been omitted for simplicity.

As shown, the first node 420a and the second node 420b, and any additional nodes, are coupled to each other by the optical wavelength bus 412 and by the optical data bus 414. The optical wavelength bus 412 transports optical carrier waves, including modulated and unmodulated optical waveforms, to each of the nodes (e.g., 420a-b). The optical data bus 414 transports modulated optical communication signals, to each of the nodes (e.g., 420a-b). In some embodiments, one or both of the nodes 420a-b (and/or any of the other additional nodes) are NADs. Details of the optically-switched data network system 400 are discussed with reference to FIGS. 6A-B.

In some embodiments, an optical frequency comb generator 416 (e.g., of a network control device 417) is coupled to the optical wavelength bus 412. Optical frequency combs represent multi-line optical emitters characterized by equally-spaced emission lines (tones) in the frequency domain. In some embodiments, the optical frequency comb generator 416 is configured to generate multiple (e.g., dozens, hundreds, or thousands) of unmodulated optical waveforms with fixed wavelength spacing, and inject (e.g., launch) the unmodulated optical waveforms onto the optical wavelength bus 412. In some embodiments, an optical source (e.g., within the optical frequency comb generator 416) that can emit at least two tones from a single aperture is coupled to the optical wavelength bus 412.

Figure 5A:
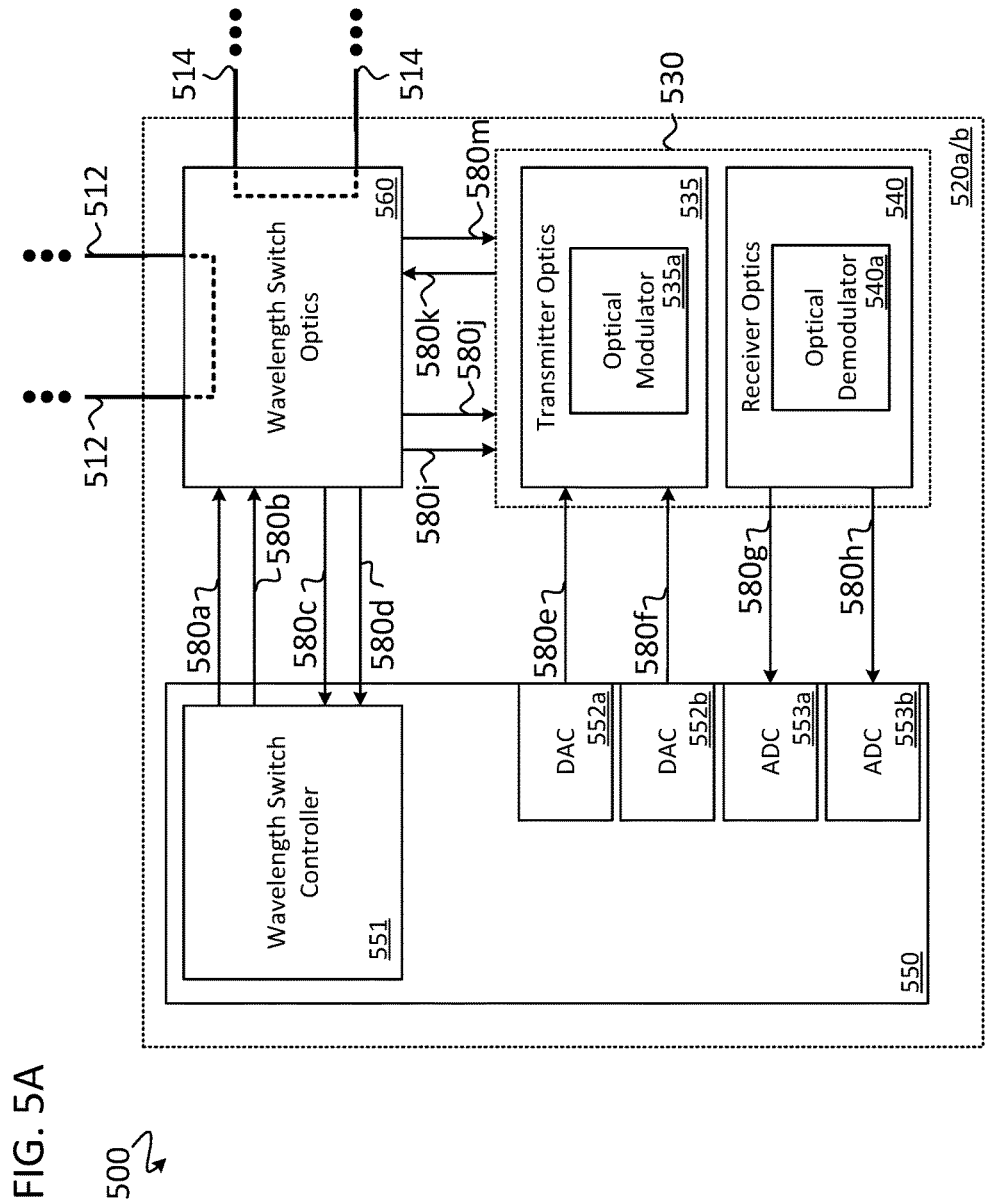
FIG. 5A-B are simplified schematic representations of portions of a node of an optically-switched data network that is similar to the network shown in FIGS. 3A-C, in accordance with some embodiments.

Details of a node 520a/b (e.g., for use in the optically-switched data network system 500 which is similar to the optically-switched data network system 300 or 400) are shown in FIG. 5A. The node 520a/b is of an optically-switched data network system 500. In the example shown, the node 520a/b is similar to either of the nodes 420a-b. For example, the node 520a may be an originating node and the node 520b may be a destination node. In accordance with some embodiments, the node 520a/b generally includes an optics module 530, a controller module 550 (e.g., a modified 40/100 Gigabit Ethernet module, or other appropriate networking module), a wavelength switch optics module 560, and connections 580a-m. The optics module 530 generally includes a transmitter optics module 535 and a receiver optics module 540. The controller module 550 generally includes a wavelength switch controller module 551, digital to analog converter (DAC) modules 552a-b, and analog to digital converter (ADC) modules 553a-b. In some embodiments, the DAC modules 552a-b and the ADC modules 553a-b are not used. In some embodiments, the optical communication signal is binary modulated (e.g., using on-off keying (OOK)) and data (e.g., communication information) modulation and data reception are performed with other digital circuitry. Also shown is a portion of an optical wavelength bus 512 (similar to the optical wavelength bus 412), and a portion of an optical data bus 514 (similar to the optical data bus 414). The transmitter optics module 535 generally includes one or more optical modulators 535a. The receiver optics module 540 generally includes one or more optical demodulators 540a. In some embodiments, the node 520a/b includes other modules or elements which have been omitted for simplicity.

The wavelength switch optics module 560 is coupled to the optical wavelength bus 512, the optical data bus 514, the wavelength switch controller module 551, the transmitter optics module 535, and the receiver optics module 540. The transmitter optics module 535 is coupled to the DAC modules 552*a-b* of the controller module 550. The receiver optics module 540 is coupled to the ADC modules 553*a-b* of the controller module 550.

The DAC modules 552*a-b* generate analog representations of digital signals for data to be transmitted by a transmitter portion of the node 520*a/b*. In some embodiments, the analog representation is an in-phase and quadrature (IQ) signal, the DAC module 552*a* provides the in-phase (I) representation of the signal, and the DAC module 552*b* provides the quadrature (Q) representation of the signal. The data to be transmitted originates at other modules, which are not shown, and is provided to the controller module 550.

The ADC modules 553*a-b* generate a digital representation of an analog signal carrying data received by a receiver portion of the node 520*a/b*. In some embodiments, the received analog signal is an IQ signal. The ADC module 553*a* provides the in-phase (I) representation of the received analog signal, and the ADC module 553*b* provides the quadrature (Q) representation of the received analog signal. The digital representation is transmitted to other modules, which are not shown, for recovery of the received data.

Regarding optical signal transmission using the node 520*a/b*, the transmitter optics module 535 receives a carrier wave from the connection 580*i* and receives analog information signals, generated by the DAC modules 552*a-b*, from the connections 580*e-f*. The transmitter optics module 535 generates an optical communication signal by modulating the carrier wave using the analog information signals and transmits the optical communication signal to the wavelength switch optics module 560 using the connection 580*k*. The wavelength switch optics module 560 injects (e.g., launches) the optical communication signal onto the optical data bus 514.

Regarding optical signal reception using the node 520*a/b*, wavelength switch optics module 560 receives a received optical communication signal from the optical data bus 514. The wavelength switch optics module 560 transmits the received optical communication signal to the receiver optics module 540 using the connection 580*m* and transmits a local oscillator waveform to the receiver optics module 540 using the connection 580*j*. The receiver optics module 540 uses the local oscillator waveform to mix down the received optical communication signal and transmits the resultant analog signal to the ADC modules 553*a-b* of the controller module 550. Further details of optical signal reception are discussed with respect to FIG. 6A-B.

Control, measurement, and data signals are exchanged between the wavelength switch controller module 551 and the wavelength switch optics module 560 using the connections 580*a-d*. Though an example of four connections (580*a-d*) are shown, in some embodiments, there are more connections or fewer connections. In some embodiments, the control, measurement and data signals include digital and/or analog electrical signals.

Figure 5B:
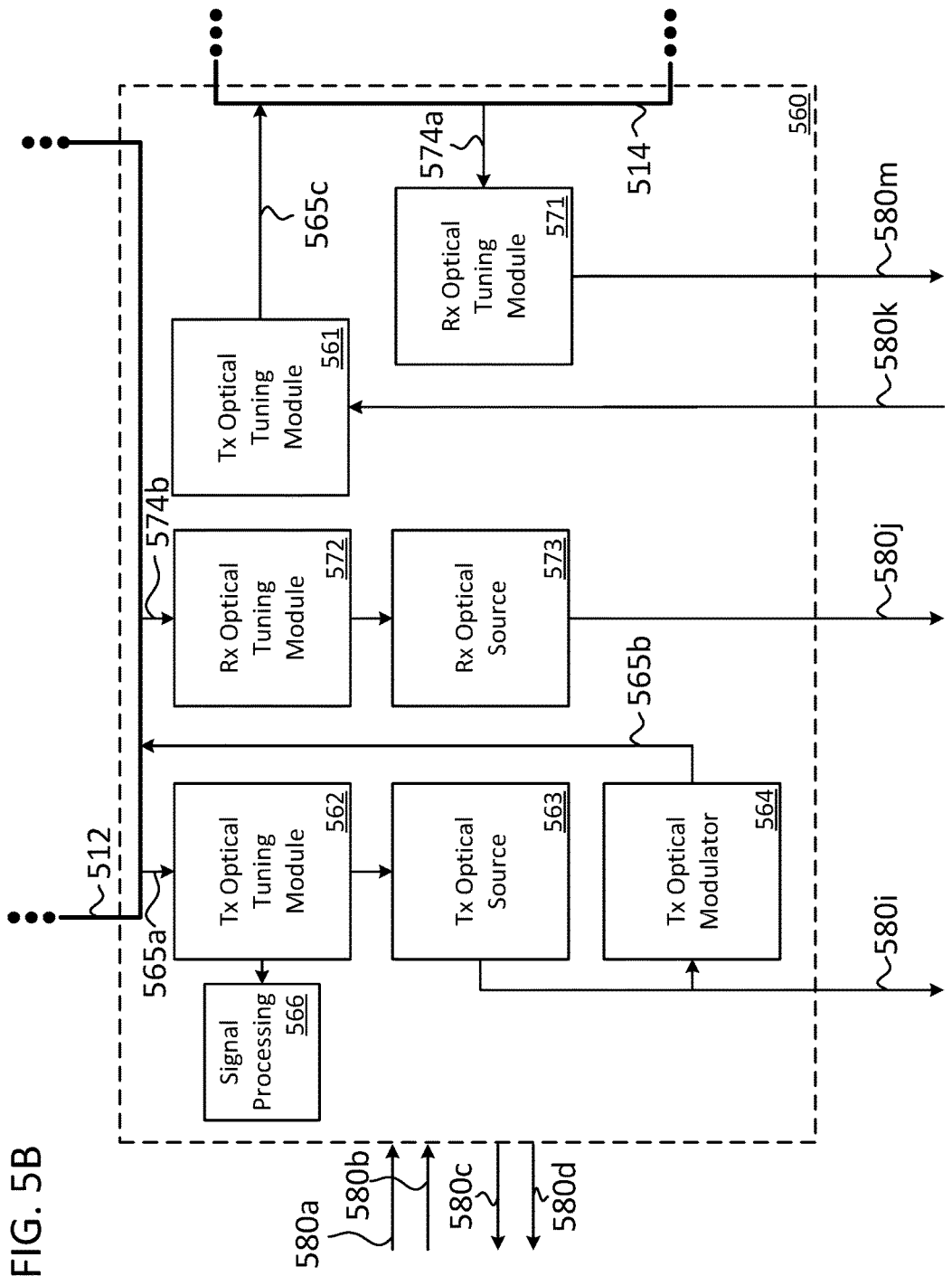

Details of the wavelength switch optics module 560 of the node 520*a/b*, are shown in FIG. 5B. In some embodiments, the wavelength switch optics module 560 generally includes a transmitter portion which includes a first transmitter (Tx) optical tuning module 561, a second Tx optical tuning module 562, a Tx optical source 563, a Tx optical modulator 564, and connections 565*a-c*. The wavelength switch optics module 560 also generally includes a receiver portion which includes a first receiver (Rx) optical tuning module 571, a second Rx optical tuning module 572, an Rx optical source 573, and connections 574*a-b*. Additionally, in some embodiments, the Tx and Rx optical sources 563 and 573 are not included. Instead, a direct detection and/or non-coherent signaling process is used in which a local oscillator in a separate optical source is not required. In this case, the source of a desired carrier wave is directly from the optical wavelength bus 512 or through the Tx or Rx optical tuning module 562 and/or 572, so that the optical wavelength bus 512 (or the combination of the optical wavelength bus 512 and the Tx or Rx optical tuning module 562 and/or 572) is considered to be the optical source that outputs the desired carrier wave.

The wavelength switch controller module 551 is coupled to the wavelength switch optics module 560 by the connections 580*a-d* to exchange control, data and measurement signals. The Tx optical source 563 is coupled to the second Tx optical tuning module 562, and to the Tx optical modulator 564. Additionally, the Tx optical source 563 is coupled to the optical modulator 535*a* of the transmitter optics module 535 (of FIG. 5A), via the connection 580*i*. The optical wavelength bus 512 is coupled to the second Tx optical tuning module 562 by the connection 565*a* and to the Tx optical modulator 564 by the connection 565*b*. The first Tx optical tuning module 561 is coupled to the optical modulator 535*a* (of FIG. 5A) by the connection 580*k*.

The Rx second optical tuning module 572 is coupled to the optical wavelength bus 512 by the connection 574*b* and is coupled to the Rx optical source 573. The Rx optical source 573 is coupled to the optical demodulator 540*a* of the receiver optics module 540 (of FIG. 5A) by the connection 580*j*. The first Rx optical tuning module 571 is coupled to the optical data bus 514 by connection 574*a* and is coupled to the optical demodulator 540*a* (of FIG. 5A) by the connection 580*m*. In some embodiments, nodes (e.g., 520*a/b*) may include more than one receiver portion.

In some embodiments, the first Tx optical tuning module 561, the second Tx optical tuning module 562, the first Rx optical tuning module 571 and the second Rx optical tuning module 572 include one or more optical couplers, optical power splitters, optoelectrical devices, one or more current-tuned ring filters and/or thermal-tuned ring filters. In some embodiments, one or more of the optical tuning modules 561, 562, 571 and 572 include one or more current-tuned ring filters and do not include thermal-tuned ring filters. The use of the carrier injection/depletion for resonance tuning of ring filters helps enable the faster tuning and switching of the nodes to different target frequencies of the carrier waves. This advantage is particularly significant in an optically-switched data network system that includes the optical frequency comb generated by the optical frequency comb generator 416 for a switched network, which can be conducive to a nanosecond level of network reconfiguration as well as for switching for individual network packets, as compared to a transport network that does not require such frequent switching and reconfiguration.

In some embodiments, the optically-switched data network system 300 or 400 advantageously implements signal collision avoidance using all or a portion of the modules shown in FIGS. 5A-B. Signal collision can occur if multiple nodes (on the optical data bus 514) were to transmit at the same wavelength/frequency. This scenario could cause interference, impair, or otherwise damage the integrity of the signals. In some embodiments, therefore, the optical wavelength bus 512 is used, not only for wavelength routing to provide or generate unmodulated carrier waves for sending and receiving data through the optical data bus 514, but also for collision avoidance purposes. The collision avoidance system described herein, in other words, enables improvements and advantages of this additional function of the optical wavelength bus 512 in an optically-switched data network system that includes the combination of both types of optical buses 512 and 514 connecting the nodes together.

In some embodiments, a collision avoidance system is implemented by incorporating an optical tuning module (e.g., 562) connected to the optical wavelength bus 512. In some embodiments, the second Tx optical tuning module 562 includes an optical power splitter and a tunable optical filter (for instance, a tunable ring filter). The optical power splitter couples a small fraction (e.g., 10%) of the optical power from the optical wavelength bus 512 and the tunable optical filter extracts a waveform at a desired wavelength (e.g., a target frequency) from coupled optical waves (e.g., waveforms transported by the optical wavelength bus 512).

In some embodiments, the presence of the desired wavelength on the optical wavelength bus 512 serves as a subscription signal (i.e., it is not modulated for this embodiment). In such embodiments, the second Tx optical tuning module 562 also includes a photodetector. The photodetector follows the tunable optical filter and measures the power of the extracted optical wave at the desired wavelength. Before the Tx optical source 563 is tuned and emits at a desired wavelength, the tunable optical filter of the second Tx optical tuning module 562 is tuned to the wavelength and the photodetector reports the optical power level at that wavelength. In such embodiments, the wavelength is determined to be occupied if the optical power level is higher than a certain threshold, and the Tx optical source 563 will postpone or cancel tuning to that wavelength and injecting an optical communication signal, thereby avoiding collision. That is, in some embodiments, the desired wavelength on the optical wavelength bus 512 serves as the above-described subscription signal. Upon detecting the presence of the subscription data, therefore, the controller module 550 implements all or a portion of the above-described collision avoidance options.

In some embodiments, the second Tx optical tuning module 562 transmits the extracted optical wave to a signal processing module 566. The signal processing module 566 includes one or more of digitizers, converters, demodulators, filters, and/or other signal processing modules. The signal processing module 566 is configured to determine if the extracted optical waveform is a subscription signal and/or includes subscription information. If so, the signal processing module 566 provides the subscription information (or a simple true/false indication that the extracted optical waveform is a subscription signal) to the wavelength switch controller module 551 (e.g., through the connections 580c-d). With the subscription information, the wavelength switch controller module 551 determines whether the extracted optical waveform is a currently occupied wavelength. The wavelength is determined to be occupied if the optical waveform is determined to be the subscription signal or modulated with the subscription information. In this situation, the wavelength switch controller module 551 causes (e.g., with a control signal through the connections 580a-b) the Tx optical source 563 or the second Tx optical tuning module 562 (e.g., in embodiments that do not include the Tx optical source 563) to postpone or cancel tuning to that wavelength, so that the node 520a/b postpones or cancels injecting an optical communication signal onto the optical data bus 514, thereby avoiding a collision.

Figure 6A:
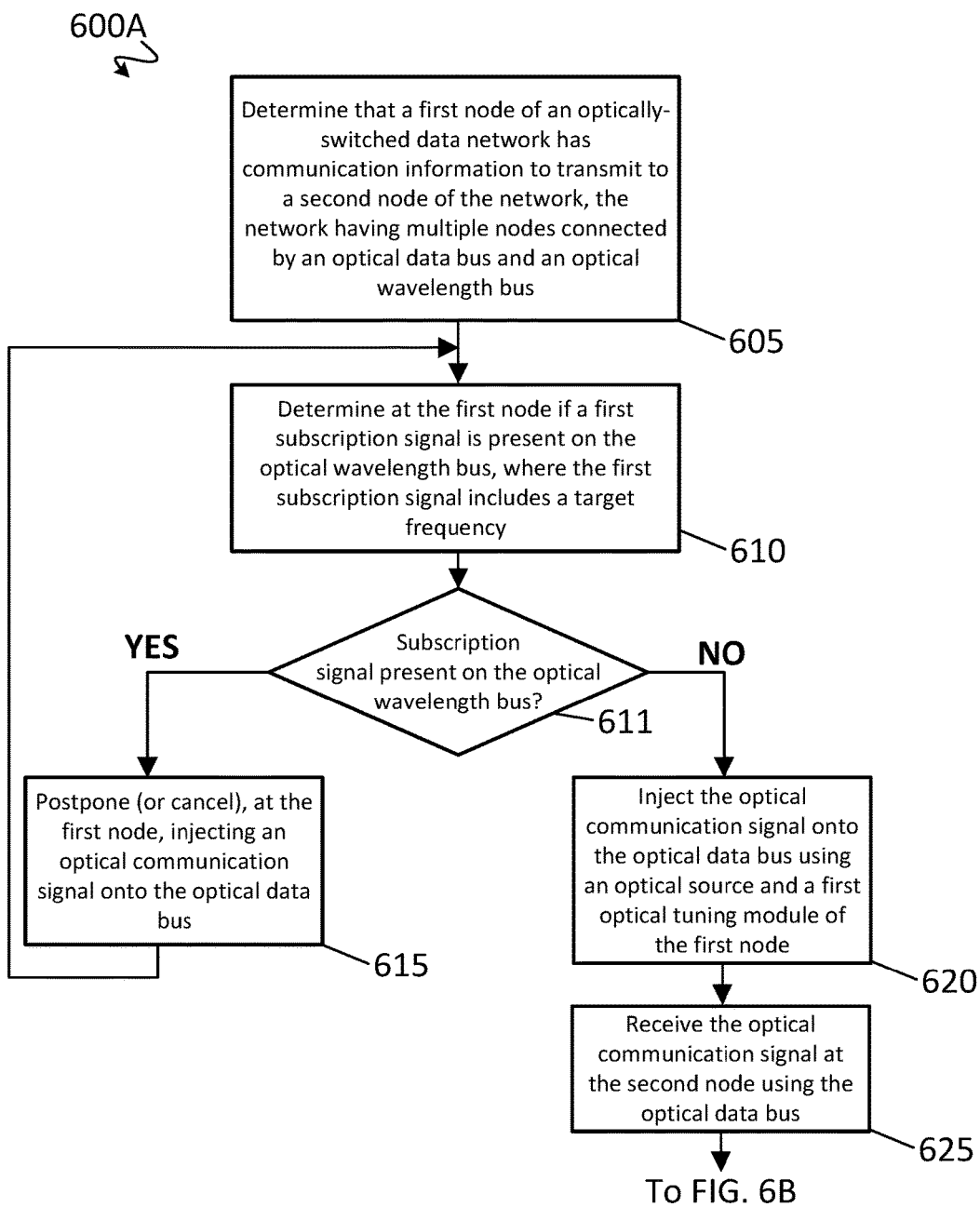
FIGS. 6A-B and FIGS. 7-12 are flowcharts of simplified example processes for collision avoidance in an optically-switched data network, in accordance with some embodiments.

FIG. 6A is a flowchart of a simplified example process 600A for elements of an optically-switched data network system (e.g., 300 or 400) that implement a portion of the above described technique for collision avoidance in an optically-switched data network system that includes the combination of both an optical wavelength bus (e.g., 512) and an optical data bus (e.g., 514) connecting the network nodes together, in accordance with some embodiments. In particular, the process 600A enables the transmitting node to determine if a desired carrier wave or target frequency is available for transmitting an optical communication signal to a receiving node. FIG. 6A is discussed with reference to FIGS. 5A-B. The particular steps, the order of steps, and the combination of steps are shown for illustrative and explanatory purposes only. Other embodiments may use different steps, orders of steps, and combinations of steps to perform similar functions.

At step 605, it is determined that a first node (e.g., the node 520a) of an optically-switched data network (e.g., 500) has communication information to transmit to a second node (e.g., the node 520b) of the optically-switched data network (500). The optically switched data network (500) has multiple nodes that are the same or similar to the first node (520a) and the second node (520b). The nodes of the optically-switched data network are connected by an optical data bus (514) and an optical wavelength bus (512).

At step 610, it is determined at the first node (520a) if a first subscription signal is present on the optical wavelength bus (512). The first subscription signal includes a target frequency.

At step 611, if it is determined that the first subscription signal is present on the optical wavelength bus (512), process flow continues to step 615. At step 615, based on the determination at step 611, the first node (520a) postpones (or cancels) injecting an optical communication signal onto the optical data bus (514) and then returns to step 610 to repeat as above. In some embodiments, the decision to postpone or cancel injecting the optical communication signal onto the optical data bus (514) is determined at the wavelength switch controller module 551. In some embodiments, if injecting the first optical communication signal onto the optical data bus (514) is postponed longer than a threshold delay, the injecting is canceled. In some embodiments, rather than postponing transmission from the first node (520a), the first optical tuning module (561) is tuned to another transmission frequency that is not equal to the target frequency. In some embodiments, if the subscription signal is detected at the target frequency, the first node (520a) will schedule communication with a different node of the optically-switched data network (500). After transmitting an optical communication signal at the other transmission frequency, the first node (520a) may return once again to determine whether or not the subscription signal is present on the optical wavelength bus (512) at the target frequency.

If at step 611, it was determined that the first subscription signal is not present on the optical wavelength bus (512), process flow continues to step 620. At step 620, based on the determination at step 611, the first node (520a) injects the optical communication signal onto the optical data bus (514) using an optical source (e.g., the Tx optical source 563 or direct from the optical wavelength bus 512) and a first optical tuning module (561) of the first node (520a). The receiving node (i.e., a second node) then receives (at step 625) the optical communication signal through the optical data bus (514).

Figure 6B:
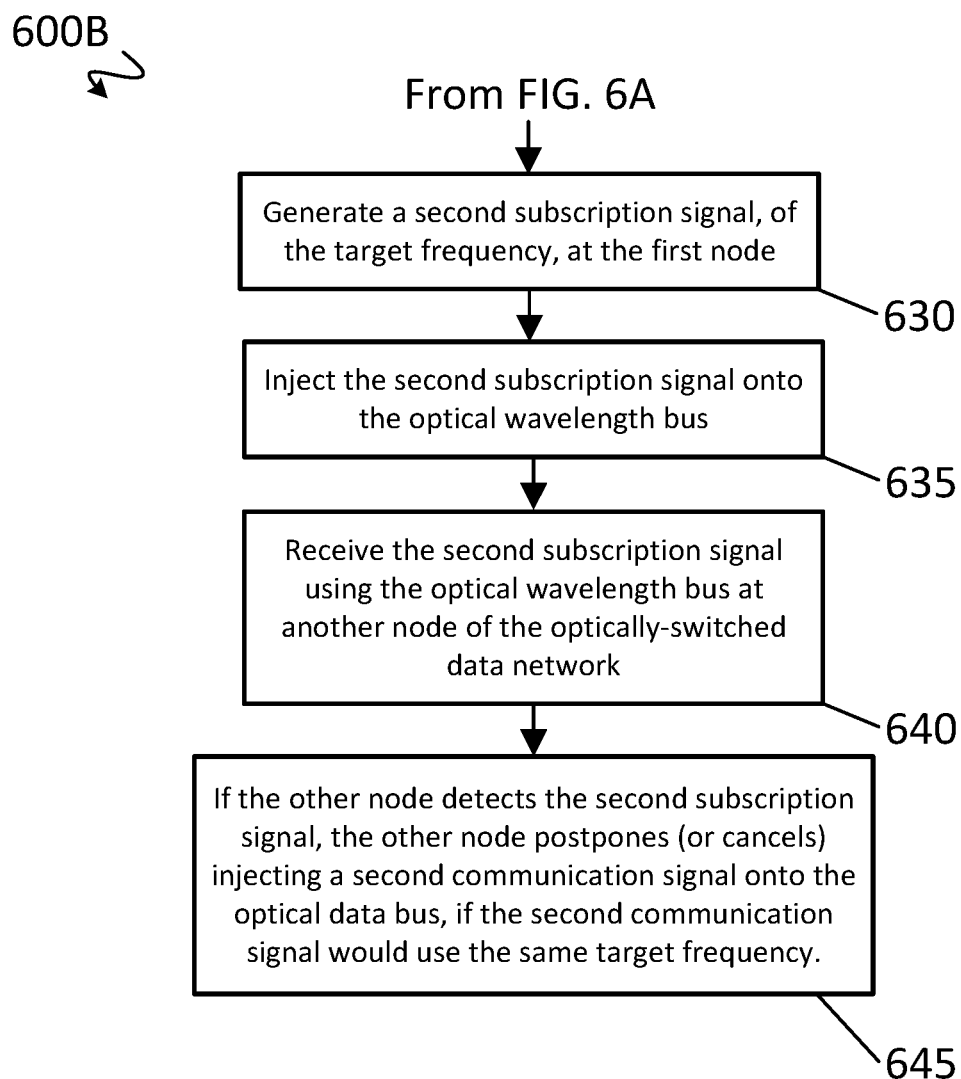

FIG. 6B is a flowchart of a simplified example process 600B for elements of the optically-switched data network system (e.g., 300 or 400) that implement additional portions of the above-described technique for collision avoidance in an optically-switched data network system, in accordance with some embodiments. In particular, the process 600B enables the transmitting node to take control of, or reserve, a desired carrier wave or target frequency, or otherwise indicate to other nodes that the desired carrier wave is currently in use. The particular steps, the order of steps, and the combination of steps are shown for illustrative and explanatory purposes only. Other embodiments may use different steps, orders of steps, and combinations of steps to perform similar functions. FIG. 6B is discussed with reference to FIGS. 5A-B.

In some embodiments, at least some portions of the example process 600B occur after step 611 and before step 620 of FIG. 6A. At step 630, a second subscription signal is generated at the first node (520a). The second subscription signal includes the target frequency. At step 635, the second subscription signal is injected onto the optical wavelength bus (512), thereby reserving a wavelength of the target frequency. In some embodiments, the second subscription signal is injected by the first Tx optical modulator (564) via the connection (565b).

At step 640, the second subscription signal is received at another node (similar to the node 520a and the node 520b) of the optically-switched data network system (500) using the optical wavelength bus (512). Then, at step 645 (as described above for steps 610 and 611), if the other node detects the second subscription signal (using the optical wavelength bus 512), then (as described above for step 615) the other node postpones (or cancels) injecting a second communication signal onto the optical data bus (514), if the second communication signal would use or include the same target frequency.

Figure 7:
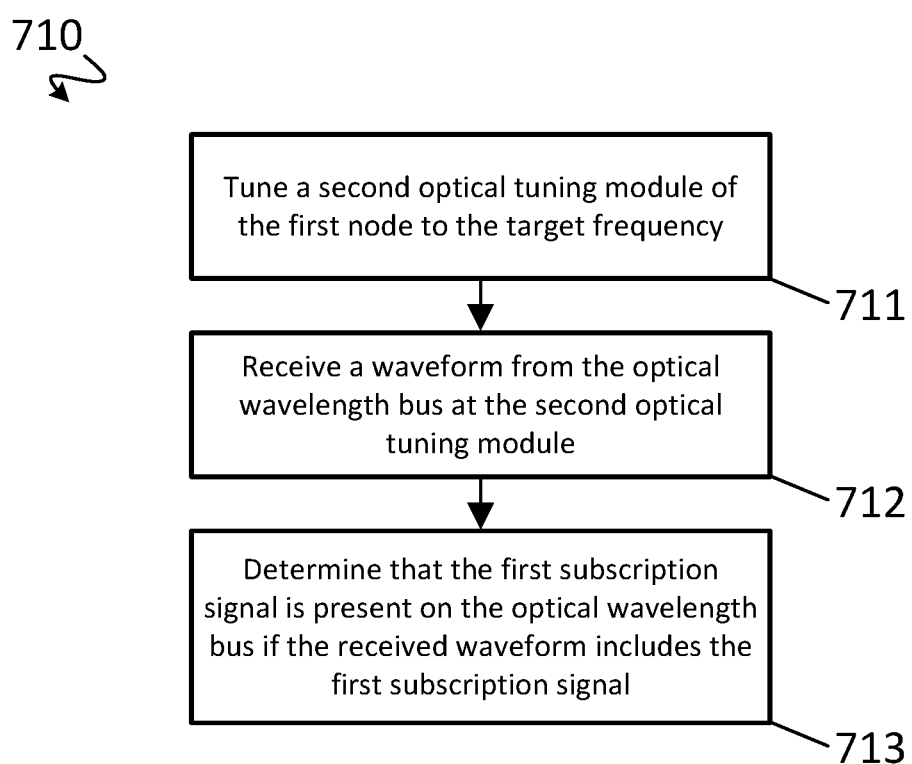

FIG. 7 is a flowchart of a simplified example process 710 for a transmitting node that implements another portion of the above-described technique for collision avoidance in an optically-switched data network system (e.g., 300 or 400), in accordance with some embodiments. In particular, the process 710 provides further details of determining if a desired carrier wave or target frequency is available for transmitting an optical communication signal to a receiving node. The particular steps, the order of steps, and the combination of steps are shown for illustrative and explanatory purposes only. Other embodiments may use different steps, orders of steps, and combinations of steps to perform similar functions. In some embodiments, all or a portion of the example process 710 is part of step 610 of the example process 600A. FIG. 7 is discussed with reference to FIGS. 5A-B.

At step 711, a second optical tuning module (562) of the first node (520a) is tuned to the target frequency. At step 712, a waveform is received from the optical wavelength bus (512) at the second optical tuning module (562). Then, at step 713, it is determined that the first subscription signal is present on the optical wavelength bus (512) if the received waveform includes the first subscription signal.

Figure 8:
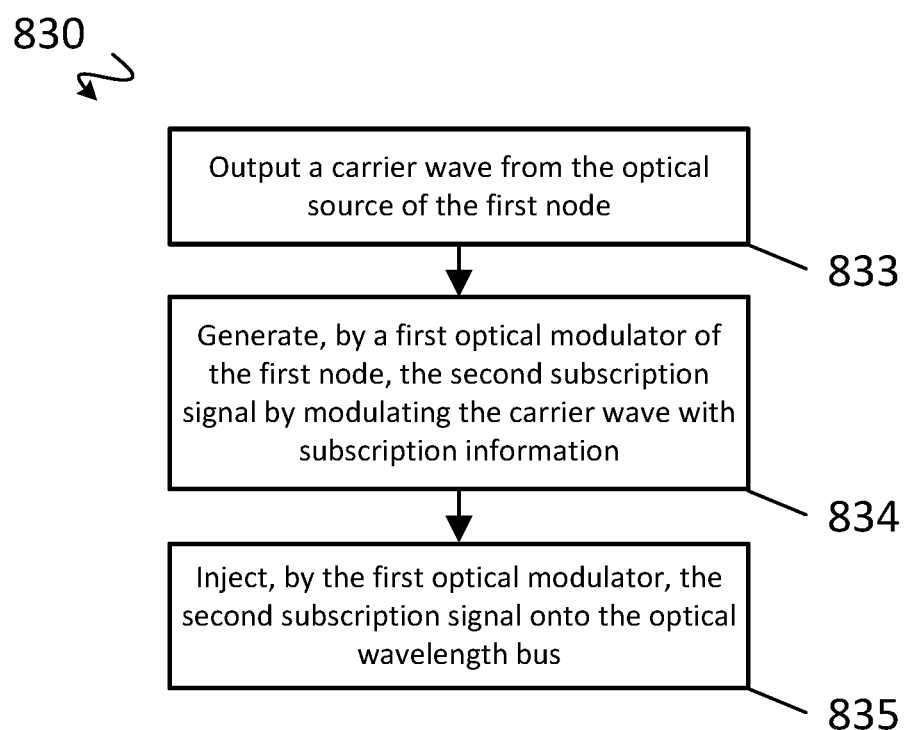

FIG. 8 is a flowchart of a simplified example process 830 for a transmitting node that implements another portion of the above-described technique for collision avoidance in an optically-switched data network, in accordance with some embodiments. In particular, the process 830 provides further details for taking control of, or reserving, a desired carrier wave or target frequency, or otherwise indicating to other nodes that the desired carrier wave is currently in use. The particular steps, the order of steps, and the combination of steps are shown for illustrative and explanatory purposes only. Other embodiments may use different steps, orders of steps, and combinations of steps to perform similar functions. In some embodiments, all or a portion of the example process 830 is part of step 630 of the example process 600B. FIG. 8 is discussed with reference to FIGS. 5A-B.

At step 833, a carrier wave is output from the optical source (e.g., the Tx optical source 563 or directly from the optical wavelength bus 512 or the second Tx optical tuning module 562) of the first node (520a). At step 834, the second subscription signal is generated by a first optical modulator (564) of the first node (520a) by modulating the carrier wave with subscription information. Then, at step 835, the second subscription signal is injected by the first optical modulator (564) onto the optical wavelength bus (512).

Figure 9:
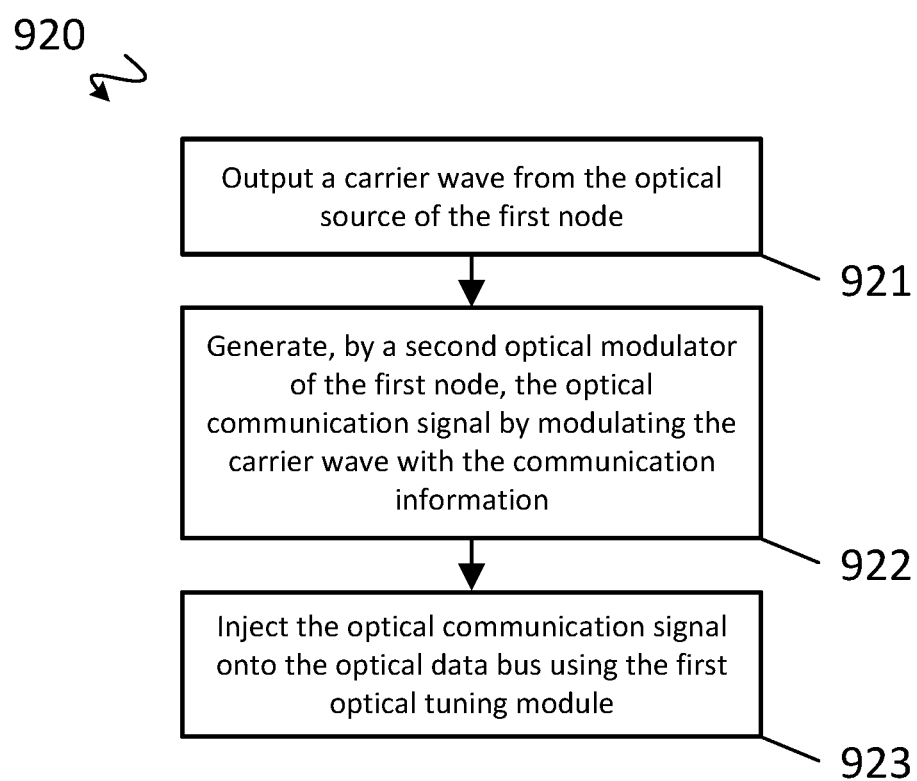

FIG. 9 is a flowchart of a simplified example process 920 for a transmitting node that implements another portion of the above-described technique for collision avoidance in an optically-switched data network, in accordance with some embodiments. In particular, the process 920 provides further details for generating an optical communication signal at the transmitting node. The particular steps, the order of steps, and the combination of steps are shown for illustrative and explanatory purposes only. Other embodiments may use different steps, orders of steps, and combinations of steps to perform similar functions. In some embodiments, all or a portion of the example process 920 is part of step 620 of the example process 600A. FIG. 9 is discussed with reference to FIGS. 5A-B.

At step 921, a carrier wave is output from the optical source (e.g., the Tx optical source 563 or directly from the optical wavelength bus 512 or the second Tx optical tuning module 562) of the first node (520a). At step 922, the optical communication signal is generated by a second optical modulator (535a) of the first node (520a) by modulating the carrier wave with the communication information (from the DAC modules 552a-b). At step 923, the optical communication signal is injected onto the optical data bus (514) using the first optical tuning module (561). In some embodiments, the optical communication signal is injected onto the optical data bus (514) by tuning the first optical tuning module (561) to the target frequency.

Figure 10:
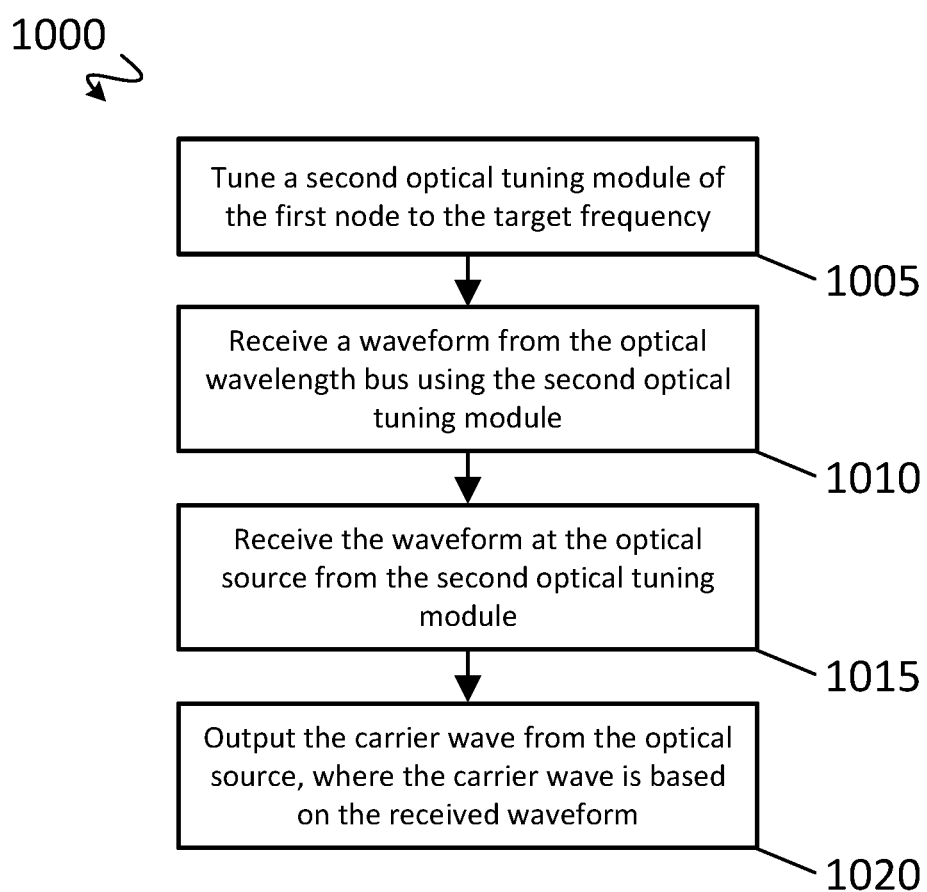

FIG. 10 is a flowchart of a simplified example process 1000 for a transmitting node that implements another portion of the above-described technique for collision avoidance in an optically-switched data network, in accordance with some embodiments. In particular, the process 1000 provides further details for outputting a carrier wave by an optical source at the transmitting node using a received waveform from the optical wavelength bus. The particular steps, the order of steps, and the combination of steps are shown for illustrative and explanatory purposes only. Other embodiments may use different steps, orders of steps, and combinations of steps to perform similar functions. In some embodiments, all or a portion of the example process 1000 is part of outputting the carrier wave as part of step 833 of the example process 830, and/or part of outputting the carrier wave as part of step 921 of the example process 920. In some embodiments, the same carrier wave is used for generating a subscription signal and for generating an optical communication signal. FIG. 10 is discussed with reference to FIGS. 5A-B.

At step 1005, a second optical tuning module (562) of the first node is tuned to the target frequency. At step 1010, a waveform is received from the optical wavelength bus (512) using the second optical tuning module (562). At step 1015, the waveform is received at the optical source (e.g., for embodiments that include the Tx optical source 563) from the second optical tuning module (562). Then, at step 1020, the carrier wave is output from the optical source (e.g., the Tx optical source 563 or directly from the optical wavelength bus 512 or the second Tx optical tuning module 562), where the carrier wave is based on the received waveform.

In some embodiments, the optical wavelength bus (512) transports multiple unmodulated optical waveforms, where each unmodulated optical waveform has a respective center frequency, and the received waveform is one of the unmodulated optical waveforms. In some embodiments that include the optical source 563, the optical source (563) outputs the carrier wave using an optical emitter (not shown; e.g., a laser) that is tuned (e.g., using injection locking) using the received waveform. In some embodiments, the optical source (563) outputs the carrier wave using an optical coupler and/or an optical amplifier (not shown) that amplifies the received waveform. That is, the optical source (563) outputs the received waveform directly, with or without performing signal conditioning of the received waveform.

Figure 11:
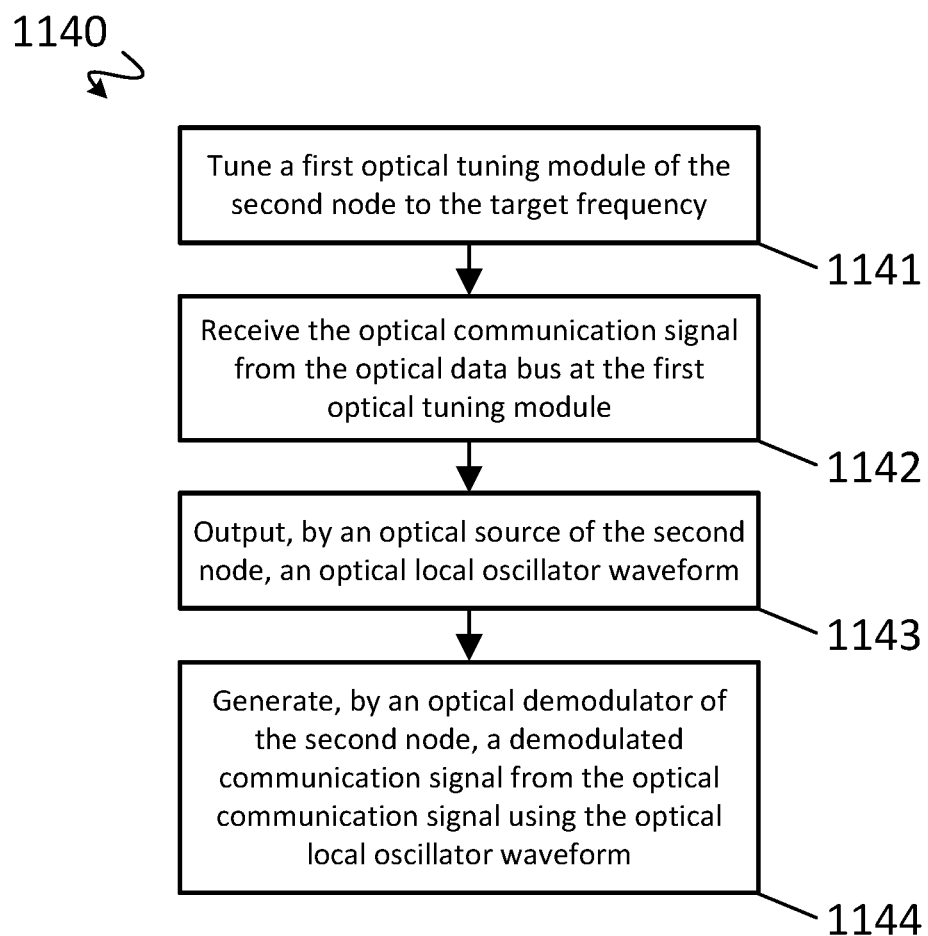

FIG. 11 is a flowchart of a simplified example process 1140 for a receiving node (e.g., the second node of the example process 600A) that implements another portion of the above-described technique for collision avoidance in an optically-switched data network, in accordance with some embodiments. In particular, the process 1140 provides further details for receiving the optical communication signal at the receiving node. The particular steps, the order of steps, and the combination of steps are shown for illustrative and explanatory purposes only. Other embodiments may use different steps, orders of steps, and combinations of steps to perform similar functions. In some embodiments, all or a portion of the example process 1140 are part of step 625 of the example process 600A. FIG. 11 is discussed with reference to FIGS. 5A-B.

At step 1141, a first optical tuning module (571) of the second node (520b) is tuned to the target frequency. At step 1142, the optical communication signal is received at the first optical tuning module (571) from the optical data bus (514). At step 1143, an optical local oscillator waveform is output by an optical source (e.g., the Rx optical source 573 or directly from the optical wavelength bus 512 or the second Rx optical tuning module 572) of the second node (520b). Then, at step 1144, a demodulated communication signal is generated by an optical demodulator (540a) of the second node (520b) from the optical communication signal using the optical local oscillator waveform.

Figure 12:
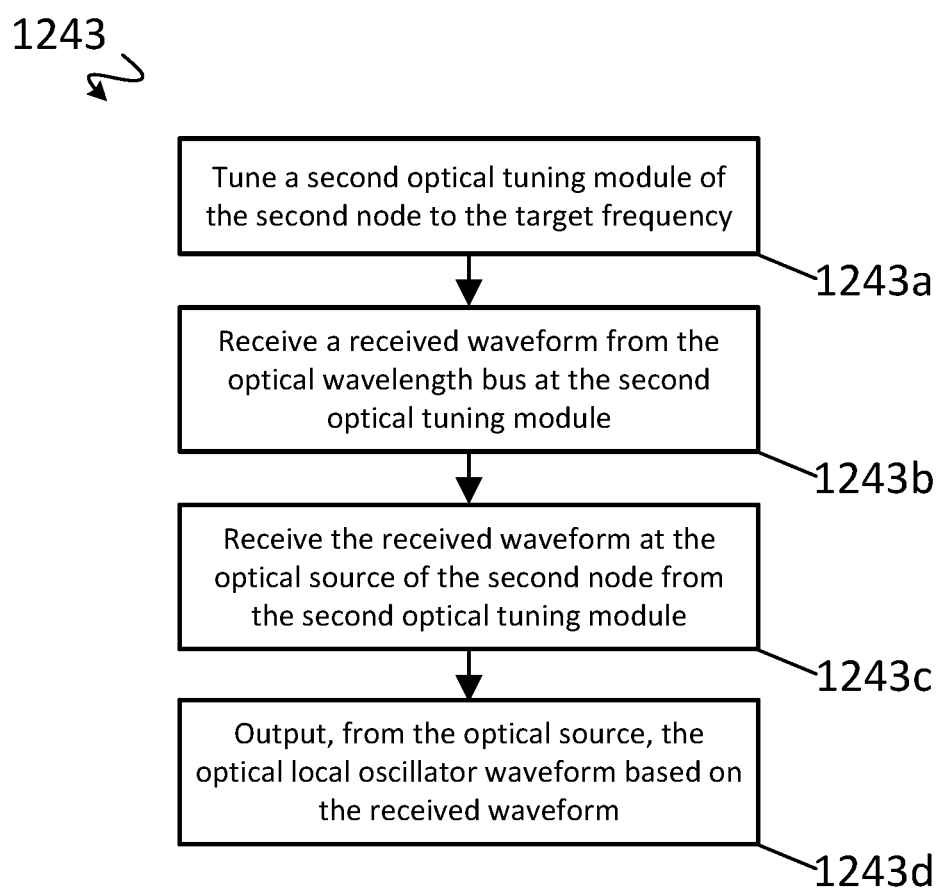

FIG. 12 is a flowchart of a simplified example process 1243 for a receiving node (e.g., the second node of the example process 600B) that implements another portion of the above-described technique for collision avoidance in an optically-switched data network, in accordance with some embodiments. In particular, the process 1243 provides further details for outputting an optical local oscillator waveform by an optical source at the receiving node using a received waveform from the optical wavelength bus. The particular steps, the order of steps, and the combination of steps are shown for illustrative and explanatory purposes only. Other embodiments may use different steps, orders of steps, and combinations of steps to perform similar functions. In some embodiments, all or a portion of the example process 1243 are part of step 1143 of the example process 1140. FIG. 12 is discussed with reference to FIGS. 5A-B.

At step 1243a, a second optical tuning module (572) of the second node (520b) is tuned to the target frequency. At step 1243b, a waveform is received from the optical wavelength bus (512) at the second optical tuning module (572). At step 1243c, the waveform is received at the optical source (e.g., for embodiments that include the Rx optical source 573) of the second node (520b) from the second optical tuning module (572). Then, at step 1243d, the optical local oscillator waveform is output from the optical source (e.g., the Rx optical source 573 or directly from the optical wavelength bus 512 or the second Rx optical tuning module 572), where the optical local oscillator waveform is based on the received waveform.

In some embodiments, the optical wavelength bus (512) transports multiple unmodulated optical waveforms, where each unmodulated optical waveform has a respective center frequency, and the received waveform is one of the unmodulated optical waveforms. In some embodiments that include the optical source 573, the optical source (573) outputs the optical local oscillator waveform using an optical emitter (not shown; e.g., a laser) that is tuned (e.g., using injection locking) using the received waveform. In some embodiments, the optical source (573) outputs the optical local oscillator waveform using an optical coupler and/or an optical amplifier (not shown) that amplifies the received waveform. That is, the optical source (573) outputs the received waveform directly, with or without performing signal conditioning of the received waveform.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. An apparatus comprising:
   a first node input to receive a first optical waveform;
   a first optical source to output a carrier waveform, the first optical source being coupled to the first node input; and
   a signal processing module coupled to the first node input;
   wherein:
   the signal processing module is configured to determine if the first optical waveform comprises a first subscription signal, the first subscription signal comprising a target frequency for transmission;
   if it is determined that the first optical waveform does not comprise the first subscription signal, the first optical source is configured to output the carrier waveform, the carrier waveform comprising the target frequency; and
   if it is determined that the first optical waveform comprises the first subscription signal, the first optical source is configured to postpone outputting the carrier waveform comprising the target frequency.

2. The apparatus of claim 1, wherein:
   the first node input comprises a first optical tuning module; and
   the first optical tuning module is configured to receive the first optical waveform by tuning to a center frequency of the first optical waveform.

3. The apparatus of claim 2, wherein the center frequency of the first optical waveform is the target frequency.

4. The apparatus of claim 1, wherein:
the first optical source is configured to output the carrier waveform having a center frequency that is equal to a center frequency of the first optical waveform.

5. The apparatus of claim 4, wherein:
the first optical source comprises an optical emitter; and
the optical emitter is configured to be tuned to the center frequency of the first optical waveform.

6. The apparatus of claim 4, wherein:
the center frequency of the first optical waveform is equal to the target frequency.

7. The apparatus of claim 1, further comprising:
a first node output to transmit a modulated carrier waveform, the modulated carrier waveform comprising the target frequency.

8. The apparatus of claim 7, wherein:
the first node output comprises a second optical tuning module; and
the second optical tuning module is configured to transmit the modulated carrier waveform by tuning to a center frequency of the modulated carrier waveform.

9. The apparatus of claim 7, wherein:
the first node input is configured to receive the first optical waveform from an optical wavelength bus; and
the first node output is configured to transmit the modulated carrier waveform on an optical data bus;
wherein the optical wavelength bus and the optical data bus are different physical optical buses.

10. The apparatus of claim 9, further comprising:
a first optical modulator with: (i) a first optical modulator input to receive data, (ii) a second optical modulator input coupled to the first optical source to receive the carrier waveform, and (iii) a first optical modulator output coupled to the first node output to transmit the modulated carrier waveform.

11. The apparatus of claim 9, further comprising:
a second node output configured to transmit a second optical waveform on the optical wavelength bus, the second optical waveform comprising a second subscription signal; and
a subscription signal generator having a subscription signal generator output coupled to the second node output for transmitting the second optical waveform.

12. The apparatus of claim 11, wherein:
the second optical waveform comprises the target frequency.

13. The apparatus of claim 11, wherein:
the subscription signal generator further comprises a first subscription signal generator input coupled to the first optical source to receive the carrier waveform;
the subscription signal generator comprises an optical modulator; and
the subscription signal generator is configured to generate the second optical waveform by modulating the carrier waveform with subscription information.

14. The apparatus of claim 9, further comprising:
a second node input configured to receive a third optical waveform from the optical wavelength bus; and
a second optical source configured to output a local oscillator waveform, the second optical source being coupled to the second node input.

15. The apparatus of claim 14, wherein:
the second node input comprises a third optical tuning module; and
the third optical tuning module is configured to receive the third optical waveform by tuning to a center frequency of the third optical waveform.

16. The apparatus of claim 14, wherein:
the second optical source is configured to output the local oscillator waveform having a center frequency that is equal to a center frequency of the third optical waveform.

17. The apparatus of claim 16, wherein:
the second optical source comprises an optical emitter; and
the optical emitter is configured to be tuned to the center frequency of the third optical waveform.

18. The apparatus of claim 14, further comprising:
a third node input configured to receive an optical communication signal from the optical data bus; and
an optical demodulator with: (i) a first optical demodulator input coupled to the third node input to receive the optical communication signal, (ii) a second optical demodulator input coupled to the second optical source to receive the local oscillator waveform, and (iii) a first optical demodulator output to output received data.

19. The apparatus of claim 18, wherein:
the third node input comprises a fourth optical tuning module; and
the fourth optical tuning module is configured to receive the optical communication signal by tuning to a center frequency of the optical communication signal.

20. The apparatus of claim 19, wherein:
the center frequency of the optical communication signal is equal to the center frequency of the third optical waveform.

* * * * *